United States Patent Office 3,335,612
Patented Aug. 15, 1967

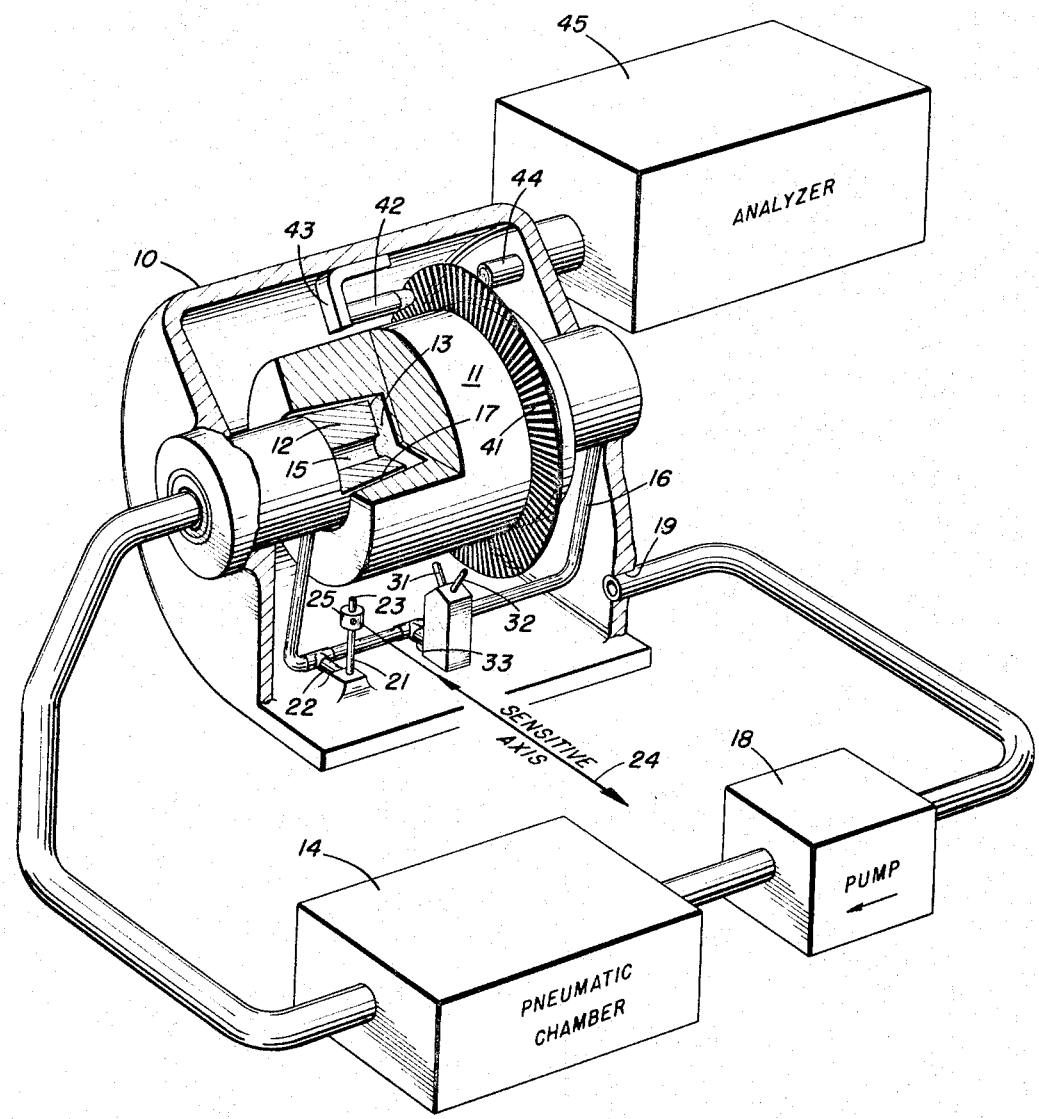

3,335,612
ACCELERATION-SENSITIVE DEVICES AND SYSTEMS
Ronald D. Stouffer, Bel Air, Md., assignor to Martin Marietta Corporation, New York, N.Y., a corporation of Maryland
Filed Mar. 25, 1964, Ser. No. 354,625
10 Claims. (Cl. 73—490)

This invention relates to instruments for the measurement of motions of a vehicle and more particularly to acceleration-sensitive instruments which integrate the acceleration forces acting on a vehicle to obtain an indication of the velocity of a vehicle and/or the distance travelled.

At the present stage of the development of the art, acceleration-sensitive devices for measuring distance and velocity can be constructed with a very high degree of precision to function with accuracy over great distances and long spans of time. To obtain such high precision, however, generally involves the use of a system having great complexity. It is not unknown for the cost of distance-measuring instrumentation to exceed the cost of the vehicle on which it is mounted.

Systems heretofore proposed for measuring distances or velocities inertially have typically involved electrical servo systems which in responding to acceleration forces produce a counteracting or slaving effect. The electrical signals generated in the system to produce the countereffect are integrated to generate resulting signals representative of the instantaneous velocity or the distance travelled during a period of time. Such systems usually require, in addition to expensive high-precision servo components, an accurate time-measurement device or system as well as electrical circuitry assembled from components of the highest precision.

Costly and complex systems of this type may be justified on vehicles intended for travel to an ultimate destination located a great distance from the point of origin. Such systems do not, however, meet the need which has existed for acceleration-sensitive instruments of substantially reduced complexity and cost for use over comparatively short distances or during comparatively brief intervals of time.

It is an object of this invention to provide a simplified and improved distance-measuring instrument which inherently responds to acceleration forces acting thereon to produce an indication of the distance travelled by the instrument from an initial starting point.

An additional object of the invention is to provide a unique acceleration-sensitive instrument which reacts to linear acceleration forces to generate angular accelerations, angular velocities and angular displacements proportionally scaled to and representative of the corresponding linear angular velocities and displacements to which the device is subjected.

By way of a brief summary of an illustrative embodiment of the invention a distance meter is provided which includes a balanced cylindrical rotor suspended on gas bearings and free to rotate in either direction about a central axis. A cantilevered flexible nozzle with a small attached mass at its extended end is oriented to point at the cylinder when the instrument is not subjected to acceleration. The nozzle is connected to a pressurized gas supply so that gas flows through the tube and impinges radially on the external surface of the cylinder. The impinging stream of gas exerts no unbalanced torque on the cylinder when the vehicle on which it is mounted is at rest or in an unaccelerated condition. If the vehicle experiences an acceleration along the sensitive axis of the device, however, an inertial force is experienced by the cantilevered nozzle. The nozzle deflects in a direction opposite to the vehicular acceleration thereby directing the gas stream away from its original radial orientation with respect to the rotor. As a result a small torque is exerted on the rotor about its axis of rotation. For small deflection angles of the nozzle the torque applied to the rotor is linearly proportional to the acceleration of the vehicle. Consequently, the angular displacements of the rotor are directly proportional to the component of the distance travelled by the vehicle along the sensitive axis of the instrument. Angular displacements of the cylinder itself therefore represent the distance travelled by the vehicle. These angular displacements are measured optically, according to a preferred form of the invention, to produce a digital signal which may be summed by a binary counter, the sum of the binary signals then constituting an electrical measurement of the distance travelled.

Although the scope of this invention is not to be limited except by the appended claims, further details of the invention as well as additional objects and advantages will be more readily discernible in connection with the following more complete description taken together with the accompanying drawing which represents in a partly schematic, partly pictorial view an acceleration-sensitive instrument constructed in accordance with this invention.

Referring now to the drawing, the acceleration-sensitive instrument is seen to comprise a housing 10 defining a sealed enclosure surrounding a symmetrical cylindrical rotor 11, preferably having a smooth periphery, suspended and balanced for rotation about its axis of symmetry. For this purpose, air bearing means are provided including a pair of frustroconical bearing members 12 inserted into bearing cavities 13 of mating configuration at opposite ends of the rotor. A pressurized gas is supplied from a pressure regulated pneumatic chamber 14 through the hollow interiors of 15 of both bearing members 12, these hollow interiors being connected by a gas feed line 16.

The pressurized gas, in escaping through the annular space 17 between the external surfaces of the bearing members 12 and the internal surfaces of the rotor within bearing cavities 13, produces a gas bearing on which the rotor 11 is supported for virtually frictionless rotation. An exhaust pump 18 connected to an outlet port 19 in the side of housing 10 maintains a reduced pressure within the enclosure of housing 10 and returns the gases to the pneumatic chamber 14.

Because of its symmetrical construction and its balanced suspension, the rotor 11 is insensitive in and of itself to accelerations of the vehicle on which it may be mounted. The acceleration sensitivity of the instrument is accomplished in this particular embodiment of the invention by the use of a torque-producing member in the form of a deflectable nozzle 21 located within the housing 10 and trained at the external surface of the rotor 11. The nozzle 21 is shown connected to receive pressurized gases over a connector section 22 from the gas feed line 16. Under a zero acceleration condition the orifice 23 in the end of the nozzle 21 is directed radially at the surface of the cylindrical rotor 11 and the jet of gas which issues from the orifice and impinges on the surface of the rotor 11 produces no net torque on the rotor which would tend to result in angular acceleration or deceleration thereof.

Deflectable nozzle 21 may be constructed of a thinwalled, somewhat flexible material to respond to linear accelerations of the instrument by deflections along its sensitive axis 24 in a direction opposite to the direction of acceleration. A small sensitive mass 25 is preferably affixed near the cantilevered end of the deflectible nozzle and may be adjusted up or down the length of the nozzle to adjust the sensitivity of nozzle deflections to linear accelerations.

Accelerations of the instrument in either direction along its sensitive axis 24 therefore tend to direct the stream of gas issuing from the nozzle 23 toward portions of the periphery of rotor 11 on one side or the other of the axis of rotation of the rotor. This produces an unbalanced torque on the rotor 11 and gives it an angular acceleration. Once set in motion in this manner, the rotor 11 continues in rotation.

The cantilevered nozzle 21 as shown in the drawing is, of course, deflectable in other directions than along sensitive axis 24. Deflections parallel to the axis of rotor 11, however, are incapable of producing a net torque about the axis of rotation of the rotor. Hence only those deflection components parallel to the sensitive axis 24 are productive of unbalanced rotational torques. If it is considered desirable to minimize or prevent nozzle deflections in directions not parallel to the sensitive axis, the nozzle could be made broad and thin for ease of deflection only along the sensitive axis. Alternatively, the nozzle could be pivoted about an axis parallel to the axis of rotation of rotor 11 with spring means to center the nozzle at its zero acceleration orientation. Construction and mounting details such as these are relatively unimportant as long as the torque-producing member is permitted a certain degree of deflection in directions parallel to the axis along which acceleration forces are to be sensed.

An instrument constructed and operated in this fashion is capable of representing within a self-contained frame of reference the accelerations, the velocities, and displacements with respect to an external frame of reference of the vehicle on which the instrument is mounted. The angular accelerations, angular velocities and angular displacements of rotor 11 thus provide a physical analogy to the corresponding linear accelerations, linear velocities and linear displacements of the vehicle along the sensitive axis in its inertial space.

For small deflection angles of nozzle 21, the torque T applied to the rotor 11 is nearly linearly related to the angular deflection of the nozzle. In turn, the angular deflection of the nozzle is nearly linearly related to the linear acceleration of the instrument along its sensitive axis. Hence, the torque T applied to the rotor 11 is linearly porportional to the acceleration $a$. The result, stated mathematically, is simply $$T = Ka \qquad (1)$$

Assume for the moment that the cylinder is suspended without friction. Its equation of motion under the influence of the applied torque T is $$T = Ka = I\alpha \qquad (2)$$

where I is the moment of inertia of the rotor and $\alpha$ is the angular acceleration of the rotor with reference to the housing.

Rearranging the above equation we see $$\alpha = \frac{K}{I} a \qquad (3)$$

Hence, by successive integrations, $$\omega = \frac{K}{I} v \qquad (4)$$

and $$\theta = \frac{K}{I} x \qquad (5)$$

where $\omega$ is the angular velocity of the rotor, $v$ is the linear velocity of the vehicle, $\theta$ is the angular displacement of the rotor and $x$ is the linear displacement of the vehicle.

The last equation means simply that the angular displacement of the cylinder measured with reference to the housing is directly proportional to the distance travelled by the vehicle in inertial space measured in a direction coincident with the sensitive axis of the device.

Gas bearings have a common problem in a system of this nature in that so-called turbine torques are generated by assymmetrical geometry in the flow paths or by stray currents of exhaust gas. One way to counteract turbine torques is by the use of two small nozzles 31 and 32 pointed in opposite directions at the surface of the rotor 11. These latter nozzles receive pressurized gases over another conduit 33 from the gas feed line 16. The orientation of nozzles 31 and 32 is finely adjusted to counteract any turbine torques resulting from the gas flow in the air bearings and through nozzle 21. This method of adjustment is successful so long as the peripheral speed of the rotor 11 is maintained small compared to the velocity of gases issuing from the nozzles. In distance meter applications the rotor speed can easily be kept below one radian per second for vehicle velocities exceeding Mach 1.

The air jets or streams issuing from nozzles 23, 31 and 32 are preferably operated at choke flow by maintaining the pressure ratio between the pressure within housing 10 and the pressure of gases supplied to the nozzles below 0.53. At or below such a pressure ratio the streams of gas issuing from the separate orifices attain sonic velocities and slight variations in supply pressure which may occur will not materially affect the torques applied by these streams of gas to the cylinder. By the use of sonic streams it is possible to minimize turbine torques to values less than one dyne-centimeter.

The assumption that the rotor 11 is mounted without any friction is not, of course, entirely valid, but it is true that static friction is completely eliminated by suspending the cylinder on hydrostatic type gas bearings. What remains is viscous friction due to the viscosity of the gas. This viscous friction, sometimes referred to as "windage" occurs at the bearing surfaces and on the external periphery of the rotor. Viscous friction effects in properly designed air bearings can be made so small that they do not exceed the windage friction on the outer surface of the rotor. Both effects will eventually bring the rotor to rest once it is set in motion. I have found that the run-down period can be extended from $10^4$ to $10^5$ seconds. Run-down time periods of this length are sufficient to obtain substantial accuracy in a distance-measuring instrument for short to medium range applications.

To measure the displacements of rotor 11 which are representative of the distance travelled from the starting point of the vehicle on which the instrument is mounted, an optical pickoff is employed in the illustrated embodiment of the invention. The optical pickoff comprises a code wheel 41 having a plurality of alternating transparent and opaque sections spaced therearound and attached to the rotor 11 for rotation therewith. One or more lamps 42 mounted within the housing such as on the bracket 43 may direct a ray of light through the transparent sections of the code wheel for reception by a photosensitive element such as phototransistor 44. The light passing through the code wheel is modulated by the dark bands and is sensed by the phototransistor 44 to produce, in one form of the invention, a digital output signal wherein the number of pulses produced by the phototransistor 44 is proportional to the rotational angle of the cylinder.

Distance readout can be performed by a simple binary counter in analyzer 45 to total the pulses received by the analyzer. The output signals generated by the pickoff arrangement and applied to analyzer 45 can represent more, however, than distance. The frequency of the output signal, for example, it is a direct measure of the velocity of the instrument in the direction of its sensitive axis since, as was pointed out in connection with Equation 4, the angular velocity of rotor 11 bears a proportionality to the linear velocity of the instrument. Indeed, the electrical output signals from instruments of this nature are capable of defining the entire position vector of a moving vehicle with respect to an external frame of reference centered on the point of origin of the vehicle.

Consequently, the output of the acceleration-sensitive instrument is capable of representing the distance travelled by the vehicle in the direction of its sensitive axis as well as the velocity of the vehicle without resorting to the use of complicated servo loops or computers of the type now so commonly employed for similar end use applications. This output, furthermore, is obtained through the use of only two moving parts in the instrument, both of which are subject to standard machining and measurement techniques. Correction for the viscous effects of the air bearings which tend over a period of time to slow the speed of rotor 11 can if it is considered desirable be achieved in the analyzer 45 by the use of a compensation circuit based on the measured time constant of the instrument. The range capability of a distance-measuring instrument constructed in accordance with this invention is limited only by the capacity of the counter to count the revolutions of the rotor. In addition, the overall gain of the instrument can be changed without increasing its dimensions by adjusting the masss and/or the spring constant of the cantilevered acceleration-sensitive nozzle. Because the rotor 11 need not be large, the gas bearings employed may be designed to be comparatively stiff without the use of a prohibitive flow of gas.

In certain applications of the present invention, it is expected that the acceleration-sensitive instrument would be mounted on an inertially stabilized platform having one or more degrees of freedom. Two or more such instruments may be employed oriented for sensitivity to accelerations in mutually orthogonal directions. The number of instruments utilized in any one system and the nature of the inertial stabilization, if any, will depend upon the character and extent of the information intended to be extracted from the instrument.

For example, with its sensitive axis properly oriented only one such instrument is absolutely necessary to be used in order to obtain a simple sum of the displacements of a vehicle over a horizontal course from its origin to its destination. Two such acceleration-sensitive instruments with mutually orthogonal sensitive axes oriented horizontally will provide information not only as to the distance covered but also as to the course of the vehicle over a surface. Three sensors may be necessary to provide three-dimensional coordinates representing the travel of a vehicle through the atmosphere or beneath the surface of a body of water. In any particular vehicular application, the mounting of the acceleration-sensitive device or devices on a stable platform will depend upon the importance given to maintaining the device sensitive to only those acceleration components occurring along a single axis.

In some cases, it may be desirable to discriminate in the output signal of the device between positive and negative displacements along the sensitive axis of the acceleration-sensitive instrument. For example, if a vehicle is to double back on its course or to circle in its course, it will usually be desirable to subtract the sum of the angular displacements of rotor 11 in one direction about its axis from the sum of its angular displacements in the other direction about its axis to provide information on the distance of the vehicle from its point of origin at all times.

In such cases, the pickoff arrangement should be augmented to sense the direction of rotation of rotor 11. This may be accomplished in many ways. For example, instead of using only one photosensitive element 44, two or more such elements might be positioned to intercept a beam or beams of light passing through the code wheel. The positions of these photosensitive elements may be coordinated with the pattern of the code wheel 41 to produce output signals having a definite phase relationship to each other indicative of the direction of displacement of rotor 11. The output analyzer 45 can be made to respond to the coded output of both photosensitive elements to discriminate between opposite directions of rotation of the rotor 11.

Other modifications and adaptations of the invention than these will doubtless occur to those skilled in the art to which the invention pertains. It is therefore intended that the embodiment shown and described herein should be taken as illustrative of the invention and not necessarily limiting of its scope. The following claims are therefore intended to cover all such modifications and adaptations as fall within the true spirit and scope of the invention in its broader aspects.

What is claimed is:

1. An acceleration-sensitive distance measurement device comprising in combination:
   a reference structure;
   an unrestrained symmetrical rotor having a generally circular periphery mounted for rotation relative to said structure about a central axis;
   jet-defining means having an orifice for the escape of gas directed radially toward the periphery of said rotor, said jet-defining means being mounted for deflection by acceleration forces along a sensitive axis transverse to the axis of rotation of said rotor;
   means for directing a stream of gas through said orifice toward said rotor, whereby deflections of said jet-defining means in response to accelerations of said device having a force component along the aforesaid sensitive axis give rise to angular accelerations of said rotor and resulting angular velocities and displacements thereof; and
   means for measuring the angular displacements of said rotor relative to said reference structure.

2. An acceleration-sensitive instrument comprising in combination:
   an unrestrained symmetrical rotor mounted for rotation about a central axis;
   a nozzle having an orifice for the escape of gas directed radially toward the periphery of said rotor;
   means mounting said nozzle for resilient deflection by acceleration forces along an axis transverse to the axis of rotation of said rotor;
   means for forcing a stream of gas through said orifice toward said rotor whereby deflections of said nozzle along the aforesaid transverse axis give rise to angular accelerations of said rotor and resulting angular velocities and displacements thereof; and
   means for detecting motions of said rotor.

3. An acceleration-sensitive distance measuring instrument comprising:
   a symmetrical rotor having a circular exterior surface;
   air bearing means mounting said rotor for unrestrained rotational movements about the axis of symmetry of said rotor;
   a resiliently deflectable nozzle having an orifice directed radially toward the exterior surface of said rotor, said nozzle being deflectable by acceleration forces from its radial orientation with respect to said rotor along a sensitive axis transverse to the axis of symmetry of said rotor, deflections of said nozzle along said sensitive axis being substantially proportional to acceleration forces parallel thereto;
   a source of pressurized gases connected to supply gases under pressure to said air bearing means and said nozzle; and
   position pickoff means for measuring the angular displacements of said rotor to obtain a measurement of the distance travelled by said instrument in directions parallel to said sensitive axis.

4. An acceleration-sensitive distance measuring instrument comprising:
   a sealed enclosure;
   a symmetrical rotor having a circular exterior surface;
   air bearing means mounting said rotor within said enclosure for unrestrained rotational movements about the axis of symmetry of said rotor;
   a resiliently deflectable nozzle mounted within said enclosure and having an orifice directed radially toward the exterior surface of said rotor, said nozzle being deflectible by acceleration forces from its radial orientation with respect to said rotor along a sensitive axis transverse to the axis of symmetry of said rotor, deflections of said nozzle along said sensitive axis being substantially proportional to acceleration forces parallel thereto;

means for exhausting gases from said sealed enclosure;

a source of pressurized gases connected to supply gases under pressure to said air bearing means and said nozzle; and position pickoff means for measuring the angular displacements of said rotor relative to said enclosure to obtain a measurement of the distance travelled by said instrument in directions parallel to said sensitive axis.

5. An acceleration-sensitive instrument comprising:

a symmetrical rotor having a generally circular external surface;

gas bearing means mounting said rotor for unrestrained rotational movements about the axis of symmetry of said rotor;

nozzle means having an orifice for the escape of gas therefrom;

means mounting said nozzle means with said orifice in a null position directed radially toward the external surface of said rotor, said mounting means permitting resilient deflections of said nozzle means from said null position along a sensitive axis transverse to the axis of symmetry of said rotor, said deflections being substantially proportional to acceleration forces along said sensitive axis;

a source of pressurized gases connected to supply gases under choke flow conditions to said gas bearing means and said nozzle;

an optical pickoff for producing electrical signals in response to angular movements of said rotor; and an analyzer responsive to signals produced by said optical pickoff for measuring motions of said instrument in directions parallel to said sensitive axis.

6. An acceleration-sensitive instrument comprising:

a sealed enclosure;

a symmetrical rotor having a generally circular external surface;

gas bearing means mounting said rotor within said enclosure for unrestrained rotational movements about the axis of symmetry of said rotor;

a comparatively thin-walled tubular nozzle having its base fixedly mounted within said enclosure and a cantilevered end projecting therefrom radially toward the surface of said rotor, the cantilevered end of said nozzle being resiliently deflectable by acceleration forces acting thereon along at least one sensitive axis transverse to the axis of said rotor;

means for exhausting gases from said sealed enclosure;

a source of pressurized gases connected to supply gases under choke flow conditions to said gas bearing means and said nozzle means; and pickoff means for measuring angular movements of said rotor relative to said enclosure to obtain a measurement of the motions of said instrument in directions parallel to said sensitive axis.

7. An acceleration-sensitive instrument comprising:

a sealed enclosure;

a symmetrical rotor having a generally circular external surface;

gas bearing means mounting said rotor within said enclosure for unrestrained rotational movements about the axis of symmetry of said rotor;

nozzle means having an orifice for the escape of gas therefrom;

means mounting said nozzle means within said enclosure with said orifice in a null position directed radially toward the external surface of said rotor, said mounting means permitting resilient deflections of said nozzle means from said null position along a sensitive axis transverse to the axis of symmetry of said rotor, said deflections being substantially proportional to acceleration forces along said sensitive axis;

means for exhausting gases from said sealed enclosure;

a source of pressurized gases connected to supply gases under choke flow conditions to said gas bearing means and said nozzle means;

at least one correction nozzle connected to said source of gases and having an orifice trained adjustably on said rotor to correct for turbine torques resulting from the operation of said gas bearing means and said nozzle means;

an optical pickoff for producing electrical signals in response to angular movements of said rotor; and an analyzer responsive to signals produced by said optical pickoff for measuring motions of said instrument in directions parallel to said sensitive axis.

8. An acceleration-sensitive instrument comprising:

a sealed enclosure;

a symmetrical rotor having a generally circular external surface;

gas bearing means mounting said rotor within said enclosure for unrestrained rotational movements about the axis of symmetry of said rotor;

a comparatively thin-walled tubular nozzle having its base fixedly mounted within said enclosure and a cantilevered end projecting therefrom radially toward the surface of said rotor, the cantilevered end of said nozzle being resiliently deflectable by acceleration forces acting thereon along at least one sensitive axis transverse to the axis of said rotor;

means for exhausting gases from said sealed enclosure;

a source of pressurized gases connected to supply gases under choke flow conditions to said gas bearing means and said nozzle;

at least one correction nozzle connected to said source of gases and having an orifice trained adjustably on said rotor to correct for turbine torques resulting from the operation of said gas bearing means and said nozzle;

an optical pickoff for producing electrical signals in response to angular movements of said rotor relative to said enclosure; and an analyzer responsive to signals produced by said optical pickoff for measuring motions of said instrument in directions parallel to said sensitive axis.

9. An acceleration-sensitive instrument comprising:

a reference structure;

an unrestrained rotor mounted to said structure for rotation about a central axis perpendicular to an acceleration-sensitive axis of said structure;

pressure means mounted on said structure for exerting a force on the peripheral surface of said rotor, said force inducing no torque on said rotor about said central axis when no acceleration forces are acting on said structure along said acceleration-sensitive axis;

means connected to said pressure means for sensing acceleration of said structure along said acceleration-sensitive axis and effecting a proportional directional adjustment of said pressure means along said acceleration-sensitive axis whereby said force exerted on said peripheral surface of said rotor induces a torque on said rotor about said central axis proportional to said acceleration force; and means for detecting motions of said rotor about said central axis.

10. An acceleration-sensitive instrument comprising:

a reference structure;

an unrestrained symmetrical rotor having a generally circular periphery mounted to said structure for rotation about a central axis;

fluid means, including at least one fluid jet impinging on the peripheral surface of said rotor, sensitive to acceleration forces on said structure along a sensitive axis transverse said central axis for inducing a torque about the axis of said rotor proportional to said acceleration forces; and means for detecting movements of said rotor about said central axis.

References Cited

UNITED STATES PATENTS

| | | | |
|---|---|---|---|
| 1,728,904 | 9/1929 | Herr | 73—490 |
| 2,384,348 | 9/1945 | Schweitzer | 73—490 X |
| 3,046,792 | 7/1962 | Morgan | 73—490 |
| 3,077,782 | 2/1963 | Slater et al. | 73—503 X |
| 3,097,533 | 7/1963 | Heinzmann | 73—490 |
| 3,148,547 | 9/1964 | Angele | 73—490 |
| 3,201,999 | 8/1965 | Byrd | 73—515 |

JAMES J. GILL, *Acting Primary Examiner.*

RICHARD C. QUEISSER, *Examiner.*